Aug. 2, 1966 S. H. SIME Re. 26,072

SILO UNLOADER

Original Filed Jan. 10, 1962 4 Sheets-Sheet 1

INVENTOR.
SYLVAN H. SIME
BY William A. Murray
ATTORNEY

SILO UNLOADER

Original Filed Jan. 10, 1962 4 Sheets-Sheet 2

INVENTOR.
SYLVAN H. SIME
BY William A. Murray
ATTORNEY

SILO UNLOADER

Original Filed Jan. 10, 1962 4 Sheets-Sheet 3

INVENTOR.
SYLVAN H. SIME

BY William A. Murray

ATTORNEY

SILO UNLOADER

Original Filed Jan. 10, 1962 4 Sheets-Sheet 4

*INVENTOR.*
SYLVAN H. SIME

BY William A. Murray

ATTORNEY

United States Patent Office

Re. 26,072
Reissued Aug. 2, 1966

26,072
SILO UNLOADER

Sylvan H. Sime, Kiester, Minn., assignor to Deere & Company, Moline, Ill., a corporation of Delaware Original No. 3,144,144, dated Aug. 11, 1964, Ser. No. 165,394, Jan. 10, 1962. Application for reissue Aug. 2, 1965, Ser. No. 479,042
19 Claims. (Cl. 214—17)

Matter enclosed in heavy brackets [ ] appears in the original patent but forms no part of this reissue specification; matter printed in italics indicates the additions made by reissue.

This invention relates to a material unloader for use in a silo. Still more particularly it relates to a type of silo or material unloader which moves on the surface of the silage and effects discharge of the upper layer of the silage through an opening in the silo wall.

In the use of surface silo unloaders, there are normally two problems of magnitude which must be met in order for the unloader to be successfully operated, the first being to maintain a relatively smooth upper surface in the silage, and the second being the ability of the surface silo unloader to move the material into the center of the silo and from thence upwardly and outwardly through the wall opening of the silo.

It is therefore the primary object of the present invention to provide a new and novel manner of moving material inwardly to the center of the silo and then both upwardly and outwardly to the wall. It is also the object of the invention to provide a rather new and novel method of maintaining the sweeping mechanism of the silo unloader in a relation to the surface of the silage so that the silage will remain in substantially a level plane throughout operation of the silo unloader.

More specifically, it is the object of the present invention to provide a new and novel structure at the center of the silo which includes an inverted cup-like element with an impeller therein. Directly and closely adjacent the lower edge of the inverted cup is provided a radial sweep auger which extends from the center of the silo toward the wall of the silo and moves material inwardly to an area beneath the inverted cup or impeller blades. The sweep auger includes a flight element disposed outwardly of the inverted cup chamber and a flipper element fixed to the auger driveshaft and normally disposed inwardly of the chamber wall. Consequently the material is moved inwardly through operation of the auger flight until it reaches the radial flipper on the auger driveshaft and is flipped upwardly into the path of the impeller blade. Connected to the side of the cup chamber is an auger adapted to receive the material from the impeller and to feed the material outwardly through the discharge opening in the silo wall.

In one form of the invention, it is proposed to provide the sweep auger structure with two distinct sections, one being a relatively short section adjacent the wall and the other being a relatively long section extending from an end spaced from the wall inwardly to the center of the silo. The outer auger section normally moves in advance of the inner section and cuts an annular trough in the surface of the silo. The inner auger section has a guide wheel on its outer end riding in the annular trough cut by the outer section and consequently the depth of cut of the inner section is determined by the depth of the annular trough created by the outer auger section. In this form of the invention it is further proposed to provide a unique manner of controlling the depth of cut of the outer auger section so that the silage in the silo will have an upper surface which is generally both horizontal and level.

In a modified form of the invention there is specifically provided a single sweep auger extending substantially the radius of the silo and a unique manner of maintaining the surface of the silage level as well as maintaining the surface substantially horizontal.

Other objects and advantages of the invention will become apparent to those skilled in the art as the nature of the invention is better understood from the following description and as shown in the accompanying drawings.

Figure 1:
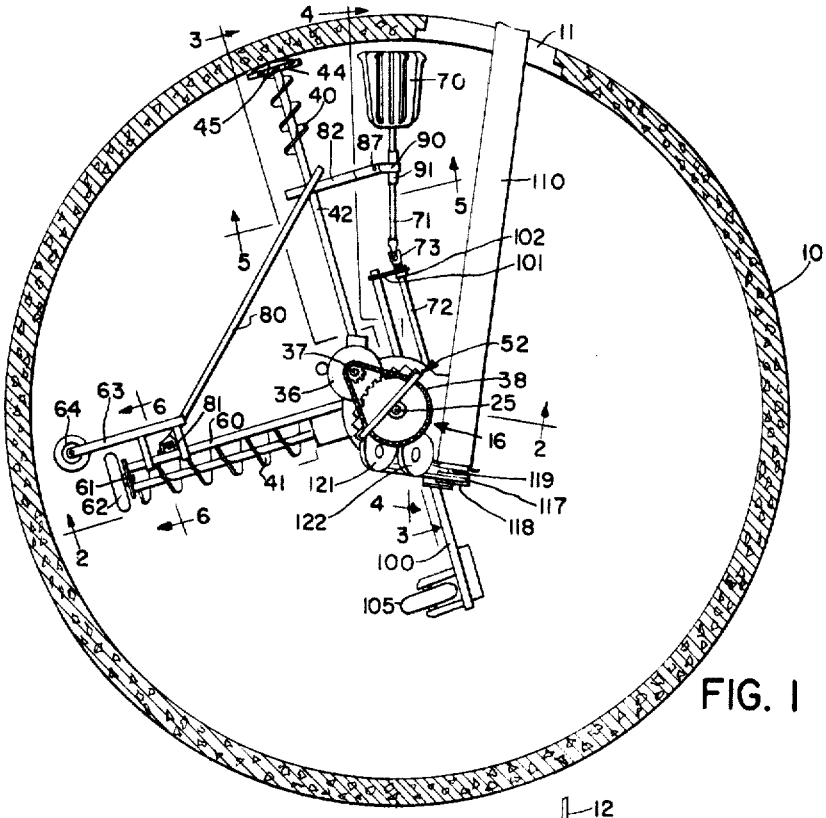
FIG. 1 is a plan view of a silo with the silo unloader positioned therein.

Referring now to the drawings, the silo unloader is normally disposed in a conventional silo having an upright cylindrical wall 10 with a series of vertically aligned side openings 11 conventionally closed by doors, not shown, which may be removed for purposes of discharging silage from the silo. The silo unloader is supported in the silo in pendulum fashion by a cable 12 depending from a supporting structure on the top of the silo. As is conventional, the cable may be retracted or extended by a winch, not shown, for purposes of raising and lowering the silo unloader.

The silo unloader is composed of a centrally located frame structure 15 including an inverted cup-shaped impeller chamber or casing 16 having a vertically disposed cylindrical casing wall 17 with a lower circular edge 18 having the same diameter as the chamber walls 17. The casing 16 is closed at its upper surface by a horizontally disposed panel wall 19. The casing 16 [has therein and on one side thereof a material discharged] has therein and on one side thereof a material discharge opening at 20.

The main framework 15 carries thereon a vertically disposed driveshaft 25 by means of upper and lower journals 26, 27 positioned above the casing 16, the lower journal 27 being disposed directly on the surface of the top panel 19. The shaft 25 extends through the top wall 19 and has a lower end 28 disposed beneath the chamber 16 and extending into a gear casing 29. Fixed to the shaft 25 internally of the casing 16 and by means of a set screw 30, are impeller blades 31. The impeller blades 31 extend laterally relative to the shaft 25 and have upper edges lying closely adjacent the top wall 19 and outer edges lying closely adjacent the cylindrical wall 17. The lower edges of the impeller blades 31 are substantially coplanar with the lower edge 18 of the cylindrical wall 17. Consequently the impeller blades 31 move within the chamber 16 so as to clear the chamber of material.

The main frame 15 also has a motor supporting structure 35 supporting an electric motor 36 having a vertical shaft 37. The shaft 37 is drivingly connected to the vertical shaft 25 by means of a speed-reducing chain drive indicated in its entirety by the reference numeral 38.

A sweep mechanism, including a first or outer auger 40 and a second or inner auger 41, is disposed on the surface of the silage. The auger 40 has an auger driveshaft 42 articulately connected by a universal type joint 43 to the central portion of the silo unloader. In viewing FIG. 1, it becomes apparent that the auger flight 40 is disposed closely proximate the wall 10 and operates to feed material centrally. The outer end of the shaft 42 rigidly carries a cutter 44 with a convex face plate 45 freely rotatable on the shaft 42. The cutter 44 cleans the silage from the wall 10 and is particularly adapted to cut frozen silage from the wall 10. In operation, the auger 40 sweeps about the surface of the silage and cuts an annular trough adjacent the wall 10.

The auger 41 is supported by an auger driveshaft 46 having an inner end drivingly connected to the lower end 28 of the drive shaft 25 by means of bevel gears 47, 48. The bevel gears 47, 48 are disposed in an extension of the gear transmission housing 29. The articulate or universal joint 43 is driven by a short stub shaft 50 extending into the gear housing 29. The shaft 50 is drivingly connected to the lower end 28 of the main shaft 25 by means of a bevel gear 51 and a countershaft 52 carrying a pinion 53 of a reversing gear drive. The pinion 53 meshes with a gear 54 carried on the shaft 50. Fixed to the main frame 25 is a laterally disposed arm 60 extending outwardly toward the wall 10 and disposed slightly above the auger 41. The outer end of the arm 60 and the auger shaft 46 are interconnected by a bracket 61 which in turn supports gage wheel 62. Also carried on the outer end of the arm 60 is a bracket structure 63 carrying a laterally disposed guide wheel 64, the latter moving about a vertical axis.

Reviewing the sweep auger arrangement in its entirety, it becomes apparent that the auger 40 is disposed adjacent the wall 10 and operates to sweep an annular path adjacent the wall 10 and to move silage inwardly. The gage wheel 62 will normally ride in this annular trough formed by the auger 40 and consequently will cause the [aguer] *auger* 41 to convey material inwardly toward the center of the silo. It therefore becomes apparent that the depth of cut of the auger 40 determines the overall [depth] *depth* of cut of the silage since the depth of cut of auger 41 is dependent upon the depth that the gage wheel 62 rides on the silage. The wheel 64 is normally out of the engagement of the wall 10. However, should abnormal conditions exist in one side of the silage or should for some reasons the pendulum or cable 12 cause the silo unloader to swing, the wheel 64 will engage the wall for the purpose of buffering the auger 41 and its gage wheel 62 against contact with the wall. Consequently the wheel 64 normally serves the purpose of limiting movement of the silo unloader in respect to the wall of the silo.

The entire silo unloader is angularly driven about the silo by means of drive wheel means including a conventional type drive wheel 70 having an inwardly directed drive wheel shaft 71, the inner end of which is connected to a propeller shaft 72 by means of a universal or articulate joint 73. The inner end of the propellent shaft 72 is drivingly associated with the lower end 28 of the vertical drive shaft 25 by means of a universal or articulate joint 74 which connects the inner end of the shaft 72 to the outer end of the intermediate drive shaft 75 which extends into the gear housing 29. The shaft 75 has a gear 76 mounted thereon driven by a worm gear 77 carried on an outer extension of the auger drive shaft 46. The worm 77 operates as a speed reducer and consequently the drive wheel 70 will normally move at a relatively low speed over the surface of the silage. Also, the drive wheel 70 will normally move in the path of the annular trough formed by the auger 40.

The drive wheel 70, auger 40, and auger 41 are all interconnected by means of laterally disposed structure composed of a diagonally and laterally disposed structural tube 80 pivoted at 81 about a horizontal axis parallel to the arm 60 and extending therefrom to a point closely adjacent the inner end of auger 40. An arm structure 82 is welded at 83 to the opposite end of the structural tube 80 and carries a bearing 84 for supporting the auger shaft 42. The opposite end of the arm structure 82 rigidly carries a U-shaped bracket 86. The bracket 86 carries between the legs of the U-shaped bracket an upright threaded adjusting stud 87. A supporting bracket 90 projects outwardly from the threaded stud 87 and carries a journal or bearing 91 for the shaft 71. The bearing 91 is permitted movement up and down by means of a supporting tube 92 fixed to the bearing 91 and carried on a horizontal pivot stud 93. The bearing supporting bracket 90 has upper and lower flanges suitable to pass relatively freely on the threaded stud 87. A nut element 94 welded to bracket 90 receives the stud 87 and operates through turning of the stud 87 to adjust vertically the entire bearing supporting bracket 90. Viewing the entire structure as a whole, it becomes apparent that the members 80, 82 and 90 are all rigidly joined together and that raising and lowering of one of the members will raise and lower the other of the members.

A laterally disposed tubular member 100 extends diametrically across the upper surface of the silage and has one end connected to the outer end of the propellent shaft 72, the latter being connected to the tubular member 100 by means of a bracket 101. A suitable journal 102 is provided to permit the shaft 72 to rotate relative to the bracket 101. The opposite end of the tube member 100 carries surface sensing wheel 105 which normally rides on the surface of the silage. Reviewing the entire structure as a whole, it will become apparent that the wheel 105 in combination with the drive wheel and auger 40 operates as a levelling mechanism. By way of explanation, the wheel 105 will ride over high or level spots causing the tubular member 100 to raise or lower. For example, should the wheel 105 pass over a high level of silage, the tubular member at the end of the wheel 105 will rise and the opposite end will be caused to lower. This will cause the shaft 71 also to be lowered since in effect a member 101 will cause the universal joint 73 to be lowered. As the shaft 71 is lowered it will cause the rigid structures 80, 82 and 90 to also be lowered and since the latter is connected to the auger shaft 42, it will cause the auger 40 to dig a deeper bite in the silage. Consequently, should at any time there be a tendency for the silage level to form in a cone shape, i.e. either to have the outer edge of the silage higher than the center or the center silage at a higher level than the outer edge, the wheel 105 will sense the uneven condition and will cause the auger 40 to dig deeper or shallower to bring the level of the silage substantially to a horizontal plane.

Also, it should be recognized that as the auger 40 makes a deeper trough, the gage wheel 62 will cause the auger 41 to also cut deeper in the silage. Consequently the entire level of the silage is gaged by the sensing wheel 105.

Figure 2:
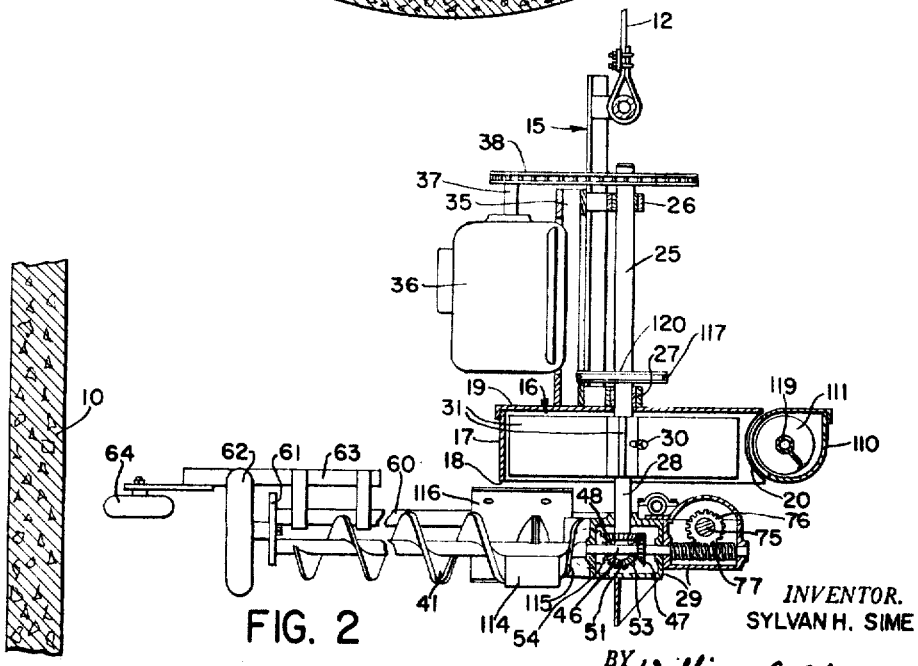
FIG. 2 is a sectional view taken substantially along the line 2—2 of FIG. 1.
Figure 3:
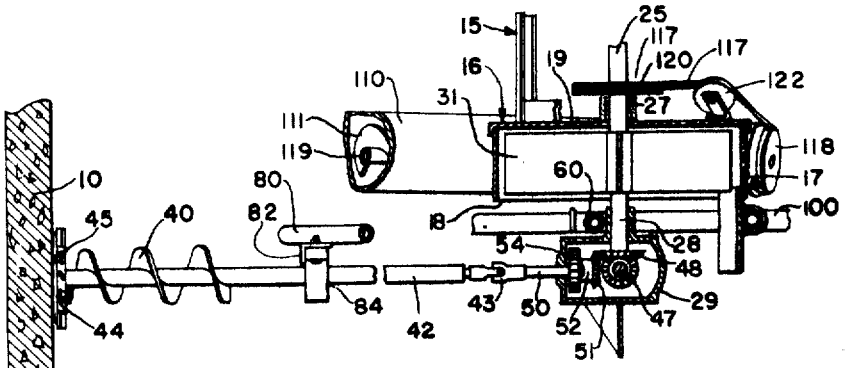
FIG. 3 is a sectional view taken substantially along the line 3—3 of FIG. 1.
Figure 4:
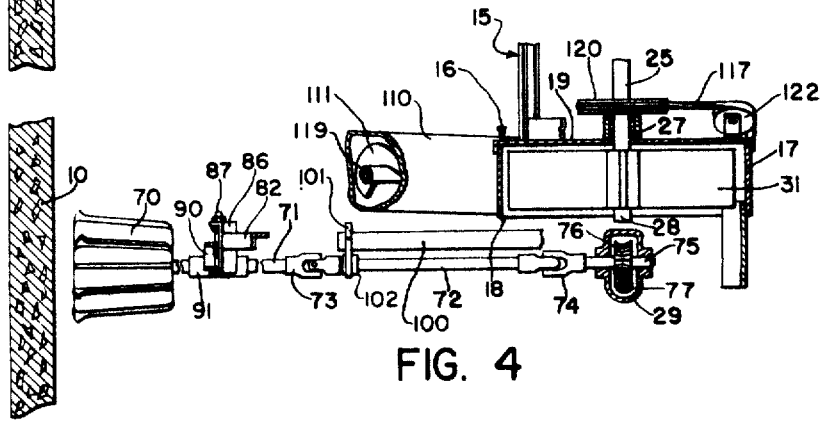
FIG. 4 is a sectional view taken substantially along the line 4—4 of FIG. 1.
Figure 5:
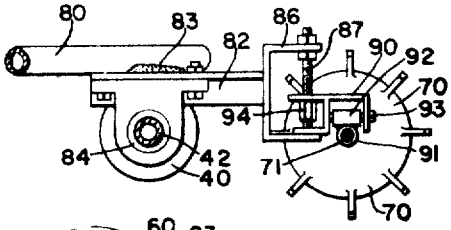
FIG. 5 is a sectional view taken substantially along the line 5—5 of FIG. 1.
Figure 6:
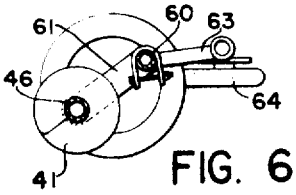
FIG. 6 is a sectional view taken substantially along the line 6—6 of FIG. 1.

Adjacent to the chamber 16 and opening into the side discharge opening 20 is an auger housing 110 extending from the chamber 16 outwardly and through one of the openings 11 in the silo wall 10. The auger housing is unique in its shape in that the width of the housing is considerably wider than the auger 111 normally mounted therein. The auger housing 110 has its intake opening adjacent the side opening 20 of the chamber 19. Reviewing FIG. 2, it becomes apparent that the auger 111 lies closely adjacent one of the walls of the housing 110 but is spaced laterally from the opposite upright wall. The purpose of so spacing the auger 111 is to permit silage or other materials to move from the auger between the wall 110 and the outer edge of the auger plate 111. The silage caught between the wall and silage will be pushed along by the auger 111 even though it will not be augered. This effect is created since there will normally be a frictional type engagement between the material being augered by the auger 111 and the material lying alongside the auger 111. Consequently by so disposing the auger in relation to the auger housing 110, the overall capacity of the discharge auger is considerably increased.

Adjacent the inner end of the auger 41 is a flipper or paddle 114 normally disposed beneath the under side of the impeller chamber 16. An auger section 115 is also mounted on the shaft 46 and is of a reversed pitch than the auger 41. Consequently the material being moved inwardly by the auger 41 contacts the flipper or paddle 114 and is driven upwardly. Material is prevented from moving further inward of the paddle 114 by the auger flight section 115. The outer edge of the flipper paddle 114 is closely adjacent the lower edge of the chamber 118 when it is in its extreme upper position. Consequently the material being thrown or lifted upwardly will pass directly into the path of the impeller blades 31 to be moved internally of the chamber 119 until passing through the opening 20 and into the auger housing 110. Suitable shielding such as 116 is provided adjacent the flipper paddle 114 so as to limit the quantity of material which may move outwardly from beneath the chamber 16.

The auger 111 is driven by means of a V-belt 117 extending over a pulley 118 at the end of an auger drive shaft 119 on which is carried the auger [flight] *flighting* 111. The belt 117 extends over a drive pulley 120 carried on the upper end of the main drive shaft 25. A pair of idler pulleys 121, 122, accommodating the extension of the belt 117 around the corner of the chamber 116, is fixed to the upper surface of the chamber 16. In this form of the invention, therefore, it becomes apparent that the entire silo unloader is driven from the single motor 36 and directly from the vertical drive shaft 25. This, therefore, provides a relatively cheap and simple type of drive.

In the modification of the invention shown in FIGS. 7–17, the central impeller portion and auger discharge are substantially identical to that of the previous form, the main distinction being that a separate electric motor 125 is carried on the top of the auger housing 110 and is drivingly connected to the auger shaft 119 by means of a chain and sprocket drive 126. Consequently the entire belt drive extending from the main shaft 25 to the auger drive shaft 119 of the previous form of the invention is eliminated. Since the main details of the central impeller section and its respective drive mechanism is identical similar reference numerals are used and further description is not deemed necessary and will not be repeated.

The supporting structure interconnecting the drive wheel with the sweep mechanism is composed of a triangularly shaped laterally disposed frame structure consisting of three rigidly interconnected tubes or pipe sections 130, 131, and 132. The tubular member 130 extends outwardly from the central portion of the silo to a point adjacent an outer drive wheel 138 and is relatively small so as to permit a degree of flexing in the tube 130. The member 130 is rigidly connected to the tubular member 132 by means of an angle iron steel element 133 which underlies adjacent ends of the tubular members 130, 132 and is welded as at 134 to the under side of tubular member 132. The tubular member 130 is rigidly held to one flange of the angle iron steel strap 133 by means of a bolt 135 extending through a rigid vertical bracket 136 on the end of the tubular member 130. There is a series of vertically spaced openings 137 in the bracket 136 so that the member 130 may be adjusted vertically relative to the other portions of the frame. The extreme outer end of the tubular member 132 has fixed thereto a U-shaped bracket structure 140 carrying an upright threaded stud 141 between the legs of the bracket 140. Mounted on the threaded stud 141 is a drive shaft supporting bracket 142 extending outwardly and carrying a bearing 143 on which is mounted a wheel drive shaft 144. The bracket structure 142 has suitable apertures therein to receive the threaded stud 141 and the bracket structure 142 may be adjusted vertically by adjusting a nut 145 on the stud 141. The bearing 143 is carried on the bracket structure 142 by means of a horizontal tube 146 adapted to pivot about the horizontal axis of a pivot bolt 147. Consequently the wheel may be adjusted relative to the supporting structure 130, 131, 132.

The tubular member 131 extends radially outwardly from the center of the silo and supports at its outer end an auger drive shaft 150, the specific type of support being a bracket 151 carrying a shaft bearing 152. The tubular member 131 is generally to one side and above the auger shaft 150. The auger shaft 150 carries an auger flighting 154 extending substantially radially of the silo. It terminates adjacent the bearing 152 at its outer end and terminates at its inner end substantially directly beneath the vertical wall 17 of the impeller chamber 16. Directly beneath the impeller chamber 16 is a radially extending flipper blade 155 operating to receive the material from the sweep auger 154 and to flip or impel it upwardly in the path of the impeller blades 31. The outer end of the auger shaft 150 carries a wall chipper wheel 156 disposed closely proximate the wall and outward of the shaft bearing 152. The chipper wheel 156 operates to chip the silage, which might be frozen or otherwise clinging to the wall. The tubular member 131 carries also an outwardly projecting bracket structure 160 supporting a wall guide wheel 161 engaging the wall above the chipper wheel 156 and operating to prevent direct contact with the wall by the blades on the chipper wheel 156.

The inner end of the auger drive shaft 150 is drivingly connected to the main drive shaft 25 by bevel gears 163, 164 disposed in a gear housing 165. The shaft 150 extends beyond the gear 163 and has mounted on the end thereof a worm gear 166 in mesh with a gear 167 carried on a short stub shaft 168. The shaft 168 extends outwardly of the gear housing and is connected to the inner end of the drive wheel shaft 144 by means of an articulate connection 169.

Figure 7:
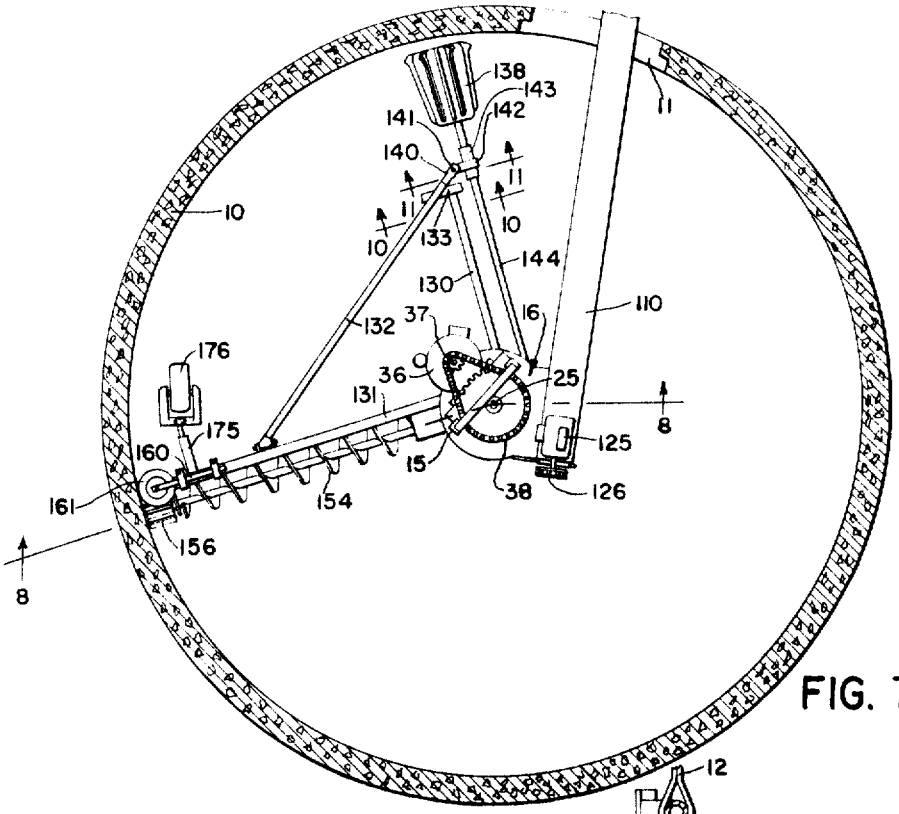
FIG. 7 is a plan view of a silo and a modified form of the silo unloader.
Figure 8:
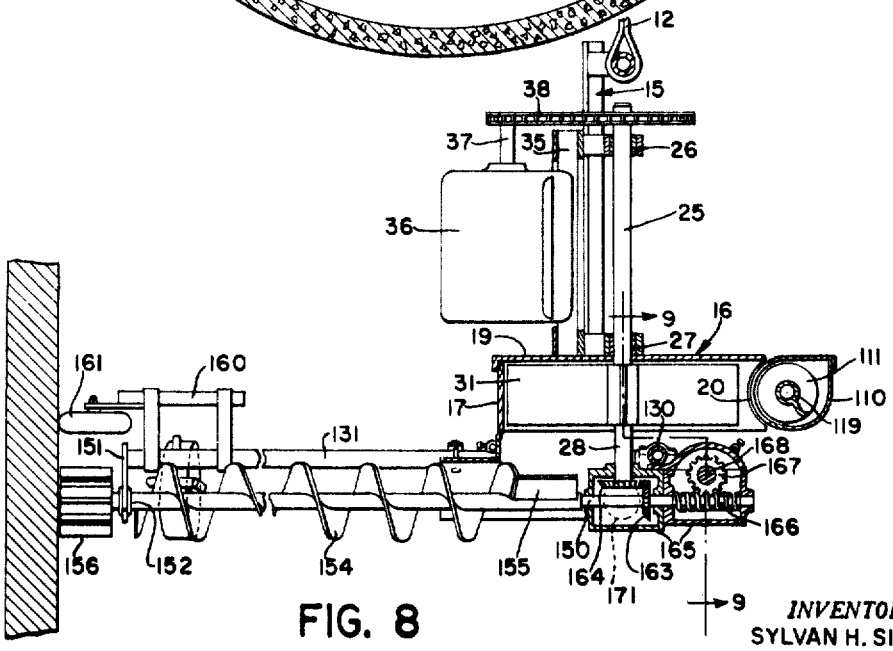
FIG. 8 is a sectional view taken substantially along the line 8—8 of FIG. 7.
Figure 9:
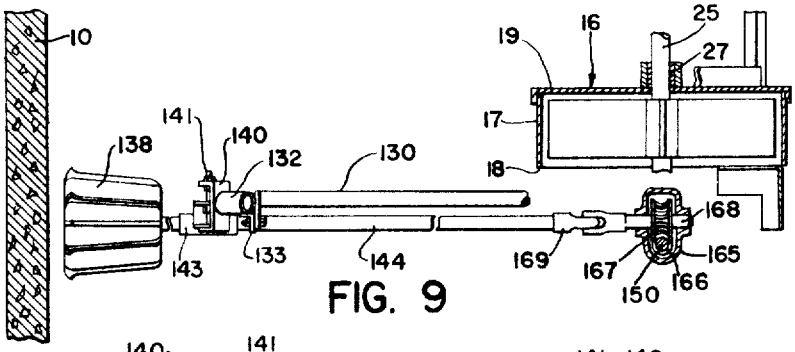
FIG. 9 is a sectional view taken substantially along the line 9—9 of FIG. 8.
Figure 10:
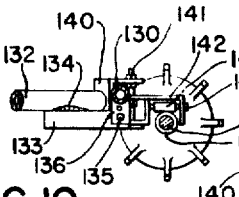
FIG. 10 is a sectional view taken substantially along the line 10—10 of FIG. 7.
Figure 11:
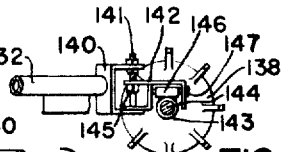
FIG. 11 is a sectional view taken substantially along the line 11—11 of FIG. 7.
Figure 12:
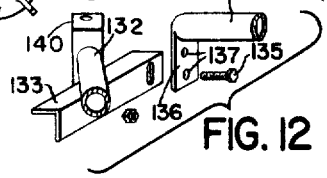
FIG. 12 is an exploded view of portions of the structure shown in FIG. 11.
Figure 13:
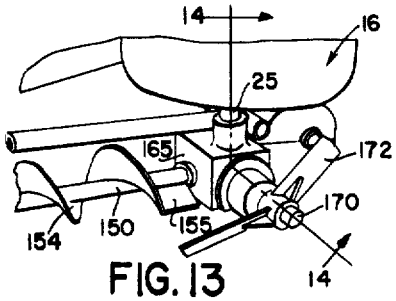
FIG. 13 is a perspective view showing a portion of the central section of the silo unloader.
Figure 14:
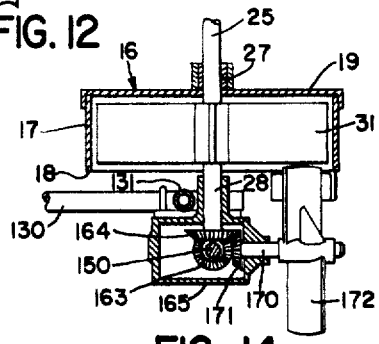
FIG. 14 is a vertical sectional view taken substantially along the line 14—14 of FIG. 13.
Figure 15:
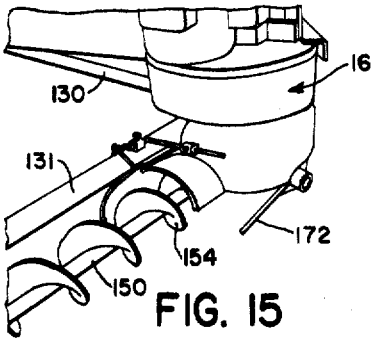
FIG. 15 is a perspective view showing a different portion of the central portion of the silo unloader.
Figure 16:
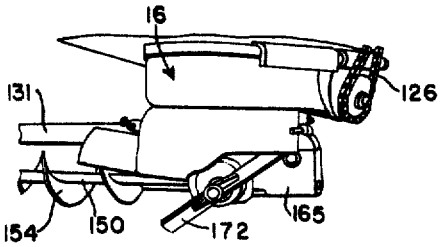
FIG. 16 is still a further perspective view showing a different portion of the central portion of the silo unloader.

Also drivingly connected to the main shaft 25 and disposed at right angles to the auger shaft 150 is a second flipper drive shaft 170. A bevel gear 171 is provided on the shaft 170 internally of the gear housing 165 and is drivingly connected to the bevel gear 164 carried on the main drive shaft 25. The outer end of the shaft 170 terminates beneath the impeller chamber 161 and carries at its outer end an impeller or second flipper blade 172. As may more clearly be understood from viewing FIG. 13, the first paddle or flipper 155 and the flipper blade 172 will normally operate so that the adjacent sides thereof move upwardly. Consequently, material moving inwardly by the auger 154 will pass the between the blades 155 and 172 which will cooperate to drive the material upwardly into the chamber 16 and in contact *with* the impeller blades 31 in the manner previously described. In viewing the silo unloader as shown in FIG. 7, the silo will normally move in a counterclockwise direction with the wheel 138 trailing relative to the sweep auger 154. It is also to be noted that the auger 154 is substantially at right angles to the driveshaft 144. It is believed that this is the best angular relation, although the levelling system presently to be described could operate from a practical standpoint at other angles. Preferably the auger 154 should be no more than 90° in advance or in a trailing direction to the drive wheel 138.

Fixed to the outer end of the tubular framework 131 is a rigid wheel frame 175 extending in a trailing direction relative to the member 131. The frame 175 carries the sensing or leveling wheel 176 which normally rides over the surface of silage. The sensing wheel 176 will operate in conjunction with the wheel 138 and the auger 154 to maintain the surface substantially level. For example, with the surface of the silage level and the center of the unloader slightly raised, the unloader could run but no silage would be moved. By lowering the cable in the center the auger 154 would be lowered a like amount in the center but because of being supported by the gauge wheel and balanced by the traction wheel through the tubular steel member 130, the auger would be lowered a lesser amount on the outside so the machine would cut and remove silage until the outside is at the same level as the inside. At that point the machine is again supported by the cable and the gauge wheel and no more silage could be removed without further lowering the support cable. The previous explained action keeps the top of the silage in a level plane but not necessarily a horizontal plane. The maintaining of the surface of the silage in a horizontal plane is achieved by a combination of the above action plus the flexing of the tubular pipe 130. This flexing is caused by the fact that the main weight of the machine is supported by the cable and because of the pendulum action, the main frame as well as the sweep, tries to maintain the level substantially horizontal, the latter being permitted by the flexing of the pipe 130. As a further example, if in FIG. 7 the traction wheel were in a low spot and the silage adjacent the silo door at a relatively high level, the upward flexing of the pipe 130 caused by the pendulum action of the main weight would allow the sweep auger to remain nearly level, and being supported at the outside end by the gauge wheel, the sweep auger would have a tendency to take a heavier than normal cut to reduce the height of the high spot. Likewise when the traction wheel was on the high spot the pipe 130 would flex downwardly due to the pendulum action of the weight of the machine keeping the sweep nearly level and riding on the gauge wheel so as to take a lesser cut, further reducing the amount of difference in the high and low levels in silage. From a theoretical standpoint, the closer the wheel 176 is to the drive wheel 138 and the auger 154 is to the wheel 138, the more effective will the leveling mechanism of the present invention operate. From a practical standpoint, it has been found that due to balance of the entire silo unloader it is better to have the auger 154 approximately 90° away from the drive wheel 138.

The modified form of the invention operates in a somewhat similar manner of the previous form other than the leveling mechanism which has been set forth in detail. The auger 154 moves the silage inwardly whereupon the flippers 155, 172 then move the material upwardly into the path of the impeller blade 31. The impeller blade drives the material through the opening in the chamber wall 16 and into the auger housing 110 which in turn moves the material outward of the silo.

While only one form of the invention has been shown, it should be recognized that other forms and variations will occur to those skilled in the art. Therefore, it should be understood that while the present disclosure was shown and described in detail for purposes of completely and fully explaining the principles of the invention, it was not the intention to so limit or narrow the invention beyond the broad concepts set forth in the appended claims.

What is claimed is:

1. A material unloader for use in a silo having an upright silo wall with a series of openings in one side thereof comprising: a main frame structure including an inverted cup-shaped impeller chamber having an upright wall with a lower terminal edge and a side discharge opening in the wall; means supporting the frame structure substantially at the center of the silo; a vertical drive shaft extending through and concentric with the axis of the chamber with a lower end below the chamber; an impeller including at least one laterally extending and vertically disposed impeller blade fixed to the shaft with an outer upright edge closely adjacent the wall and a lower edge substantially coplanar with the lower edge of the wall; sweep means disposed radially in the silo beneath the chamber and extending substantially from the center to the wall of the silo and including a laterally extending auger drive shaft, an auger flighting on the shaft outboard of the chamber and terminating adjacent the wall of the chamber; a flipper fixed to and extending radially from the auger shaft beneath and inboard of the chamber and adapted to flip material upwardly in the path of the impeller blade; drive means between the lower end of the drive shaft and the auger drive shaft; an auger discharge housing having one end connected to the chamber adjacent to and for receiving material through the side discharge opening, and extending therefrom through an opening in the silo wall, an auger within the auger housing for discharging material through the opening; and a drive mechanism for effecting rotation of the sweep means over the surface of the silage.

2. A material unloader for use in a silo having an upright silo wall with a series of openings in one side thereof comprising: a main frame structure including an inverted cup-shaped impeller chamber having a substantially upright wall with a lower terminal edge and a side discharge opening in the wall; means supporting the frame structure adjacent the center of the silo; a vertical drive shaft extending through and concentric with the axis of the chamber with a lower end below the chamber; an impeller including at least one laterally extending and vertically disposed impeller blade fixed to the shaft with an outer upright edge closely adjacent the wall and a lower edge substantially coplanar with the lower edge of the wall; sweep means disposed radially in the silo beneath the chamber and extending substantially from the center to the wall of the silo and including a laterally extending auger drive shaft, an auger flighting on the shaft outboard of the chamber and terminating adjacent the wall of the chamber; a flipper fixed to and extending radially from the auger shaft beneath and inboard of the chamber and adapted to flip material upwardly in the path of the impeller blade; drive means between the lower end of the drive shaft and the auger drive shaft; a discharge conveyor housing having one end connected to the chamber adjacent to and for receiving material through the side discharge opening, and extending therefrom through an opening in the silo wall, a conveyor within the housing for discharging material through the opening; and a drive mechanism for effecting rotation of the sweep means over the surface of the silage.

3. A material unloader for use in a silo having an upright silo wall with a series of openings in a side thereof comprising: a main frame structure including an inverted cup-shaped impeller chamber having an upright wall with a lower terminal edge and a side discharge opening in the chamber; means supporting the frame structure adjacent the center of the silo; a vertical drive shaft substantially at the center of the chamber with a lower end below the chamber; an impeller including at least one laterally extending and vertically disposed impeller blade fixed to the shaft with an outer edge closely adjacent the chamber wall and a lower edge substantially on the level of the lower edge thereof; sweep means disposed radially in the silo beneath the chamber and extending substantially from the center to the wall of the silo and including a laterally extending auger drive shaft, an auger flighting on the shaft outboard of the chamber and terminating adjacent the wall of the chamber; drive means between the lower end of the vertical drive shaft and the auger drive shaft for effecting rotation of the latter; a flipper blade fixed to and extending radially from the auger shaft beneath and inboard of the chamber and adapted to flip material upwardly in the path of the impeller blade, the flipper blade having a path of rotation the upper portion of which is closely proximate the lower edge of the impeller blade; a flight type discharge conveyor having one end connected to the chamber adjacent to and for receiving material through the side discharge, and extending therefrom through an opening in the silo wall; and a drive mechanism for effecting rotation of the sweep means over the surface of the silage.

4. A material unloader for use in a silo having an upright silo wall with a series of openings in a side thereof comprising: a main frame structure including an inverted cup-shaped impeller chamber having an upright wall with a lower terminal edge and a discharge opening at the side of the chamber; means supporting the frame structure substantially at the center of the silo; a vertical drive shaft centrally located in the chamber with a lower end below the chamber; an impeller including at least one laterally extending and vertically disposed impeller blade fixed to the shaft with an outer edge closely adjacent the chamber wall and a lower edge substantially at a level with the lower edge thereof; sweep means disposed radially in the silo beneath the chamber and extending substantially from the center to the wall of the silo and including a laterally extending auger drive shaft, an auger flighting on the shaft outboard of the chamber and terminating adjacent the wall of the chamber; drive means between the vertical drive shaft and the auger drive shaft for effecting rotation of the latter; a flipper blade fixed to and extending radially from the auger shaft beneath and inboard of the chamber and adapted to flip material upwardly in the path of the impeller blade, the flipper blade having a path of rotation the upper portion of which is closely proximate the lower edge of the impeller blade; a guide plate on the impeller chamber depending therefrom and adjacent to the flipper for guiding materials into the path of the impeller and retaining material within the confines of the chamber; a discharge conveyor including a housing having one end connected to the chamber adjacent to and for receiving material through the side discharge and extending therefrom through an opening in the silo wall, and a movable flight type conveyor element contained in the housing for moving material through the opening; and a drive mechanism for effecting rotation of the sweep means over the surface of the silage.

5. A material unloader for use in a silo having an upright cylindrical silo wall with a series of openings in one side thereof comprising: a main frame structure including an inverted cup-shaped impeller chamber with upright peripheral wall having a lower terminal edge substantially equal in radius to the upright wall of the chamber and a side discharge opening in the wall; means supporting the frame structure substantially at the center of the silo; a vertical drive shaft concentric with the axis of the chamber with an upper end above and a lower end below the chamber; an impeller including at least one laterally extending and vertically disposed impeller blade fixed to the shaft with an outer edge closely adjacent the chamber wall and a lower edge substantially at a level with the lower edge thereof; sweep means disposed radially in the silo beneath the chamber and extending substantially from the center to the wall of the silo and including a laterally extending auger drive shaft drivingly connected at its inner end to the lower end of the drive shaft, an auger flighting on the auger shaft outboard of the chamber and terminating adjacent the wall of the chamber, a flipper fixed to and extending radially from the auger shaft beneath and inboard of the chamber and adapted to flip material upwardly in the path of the impeller blade; an auger discharge housing having one end adjacent the chamber adjacent to and for receiving material through the side discharge and extending therefrom through an opening in the silo wall; a horizontal pivotal connection between the auger housing and the chamber; an auger within the auger housing for discharging material through the opening; and a drive mechanism for effecting rotation of the sweep means over the surface of the silage.

6. A material unloader for use in a silo having an upright cylindrical silo wall with a series of openings in the side thereof comprising: a main frame structure including an inverted cup-shaped impeller chamber with an upright peripheral wall having a lower terminal edge and a side discharge opening in the wall; means supporting the frame structure substantially at the center of the silo; a vertical drive shaft substantially at the center of the chamber with an upper end above and a lower end below the chamber; an impeller including at least one laterally extending and vertically disposed impeller blade fixed to the shaft with an outer upright edge closely adjacent the chamber wall and a lower edge substantially coplanar with the lower edge thereof; sweep means disposed radially in the silo beneath the chamber and extending substantially from the center to the wall of the silo and including a laterally extending auger drive shaft drivingly connected at its inner end to the lower end of the drive shaft, an auger flighting on the auger shaft terminating adjacent the wall of the chamber and effective to move material to the center of the silo; a flipper blade drivingly connected to the lower end of the drive shaft beneath the impeller and adapted to flip material upwardly in the path of the impeller blade; an auger discharge housing having one end adjacent the chamber adjacent to and for receiving material through the side discharge and extending therefrom through an opening in the silo wall; a horizontal pivotal connection between the auger housing and the casing; an auger within the auger housing for discharging material through the opening and a drive mechanism for effecting rotation of the sweep means over the surface of the silage.

7. A material unloader for use in a silo having an upright cylindrical silo wall with a series of openings in one side thereof comprising: a main frame structure including an inverted cup-shaped impeller chamber with an upright annular wall having a lower terminal edge and a side discharge opening in the wall; means supporting the frame structure adjacent the center of the silo; a vertical drive shaft concentric with the axis of the chamber with an upper end above and a lower end below the chamber; an impeller including at least one laterally extending and vertically disposed impeller blade fixed to the shaft with an outer upright edge closely adjacent the chamber wall and a lower edge substantially coplanar with the lower edge thereof; sweep means disposed radially in the silo beneath the chamber and extending substantially from the center to the wall of the silo and including a laterally extending auger drive shaft drivingly connected at its inner end to the lower end of the drive shaft, an auger flighting on the auger shaft terminating adjacent the wall of the chamber and effective to move material to the center of the silo; a first flipper blade fixed to and extending radially from the auger shaft beneath and inboard of the chamber and adapted to flip material upwardly in the path of the impeller blade; a flipper blade shaft extending at right angles to the auger shaft and drivingly connected to the lower end of the drive shaft; a second flipper blade mounted on the flipper shaft effective to move material upwardly into the chamber; an auger discharge housing having one end adjacent the chamber adjacent to and for receiving material through the side discharge and extending therefrom through an opening in the silo wall; a horizontal pivotal connection between the auger housing and the casing; an auger within the auger housing for discharging material through the opening; and a drive machanism for effecting rotation of the sweep means over the surface of the silage.

8. A silo unloader for use in a silo having an upright silo wall with a side opening therein comprising: a main frame structure including a downwardly opening impeller chamber substantially at the center of the silo with a side discharge opening therein; a vertically disposed drive shaft extending through the chamber with a lower end beneath the chamber; radially extending impeller blade means supported on the shaft within the chamber; a sweep auger drivingly connected to the lower end of the vertical shaft and extending from an inner end adjacent the chamber to an outer end adjacent the silo wall, the auger being supported on the frame structure to move over the silage surface; a flipper blade drivingly connected to the vertical shaft and substantially horizontally aligned with the inner end of the sweep auger and effective to move material received from the auger upwardly and within the path of the impeller blade means; a discharge conveyor including a housing having an intake end supported on the frame structure for receiving material through the side discharge opening of the chamber and extending therefrom to an outer end retained in the side opening of the silo, and an auger within the auger housing for moving material from the chamber; and drive means effecting a slow rate of rotation of the drive shaft whereby the impeller blade means will move a small volume of air, and material moved by the impeller blade means will be predominantly by material coming into contact with the blade means and negligibly by the movement of air.

9. The invention defined in claim 8 in which the auger housing is considerably wider than the auger, the auger is disposed proximate the bottom and one side of the housing thereby leaving a spacing between the auger and the other side of the housing.

10. A silo unloader for use in a silo having an upright silo wall with a side opening therein comprising: a main frame structure including a downwardly opening impeller chamber substantially at the center of the silo with a side discharge opening therein; a vertically disposed drive shaft extending through the chamber with a lower end beneath the chamber; radially extending impeller blade means supported on the shaft within the chamber; a sweep conveyor drivingly connected to the lower end of the vertical shaft and extending from an inner end adjacent the chamber to an outer end adjacent the silo wall, the with the inner end of the conveyor and effective to move over the silage surface; a flipper blade drivingly connected to the vertical shaft and substantially horizontally aligned with the inner end of the conveyor and effective to move material received from the conveyor upwardly and within the path of the impeller blade means; a discharge conveyor including a housing having an intake end supported on the frame structure for receiving material through the side discharge opening of the chamber and extending therefrom to an outer end retained in the side opening of the silo, and a flight type conveyance device within the housing for moving material from the chamber; and drive means effecting a slow rate of rotation of the drive shaft whereby the impeller blade means will move a small volume of air, and material moved by the impeller blade means will be predominantly by material coming into contact with the blade means and negligibly by the movement of air.

11. A solo unloader for use in a silo having an upright silo wall with a side opening therein comprising: a main frame structure including a downwardly opening impeller chamber substantially at the center of the silo with a side discharge opening therein; a vertically disposed drive shaft extending through the chamber with a lower end beneath the chamber; a sweep conveyor drivingly connected to the lower end of the vertical shaft and extending from an inner end adjacent the chamber to an outer end adjacent the silo wall, the conveyor being supported on the frame structure to move over the silage surface; impeller blade means disposed within the chamber drivingly connected to the vertical shaft and effective to move material received from the conveyor upwardly and outwardly the side discharge opening in the chamber; a discharge conveyor including a housing having an intake end supported on the frame structure for receiving material through the side discharge opening of the chamber and extending therefrom to an outer end retained in the side opening of the silo, and a flight type conveyance device within the housing for moving material from the chamber; and drive means effecting a slow rate of rotation of the drive shaft whereby the impeller blade means will move a small volume of air, and material moved by the impeller blade means will be predominantly by material coming into contact with the blade means and negligibly by the movement of air.

12. A silo unloader for use in a silo having an upright silo wall with a side opening therein comprising: a main frame structure including a downwardly opening impeller chamber substantially at the center of the silo with a side discharge opening therein; a vertically disposed drive shaft extending through the chamber with a lower end beneath the chamber; a sweep auger drivingly connected to the lower end of the vertical shaft extending from an inner end adjacent the chamber to an outer end adjacent the silo wall, the auger being supported on the frame structure to move over the silage surface; impeller blade means within the chamber drivingly connected to the vertical shaft effective to move material received from the auger upwardly and outwardly the side discharge opening in the chamber means; a discharge conveyor including a housing having an intake end supported on the frame structure for receiving material through the side discharge opening of the chamber and extending therefrom to an outer end retained in the side opening of the silo, and an auger within the auger housing for moving material from the chamber, the auger including an auger shaft projecting outwardly an end of the auger housing; a motor and drive means effecting a slow rate of rotation of the drive shaft whereby the impeller blade means will move a small volume of air and material moved by the impeller blade means will be predominantly by material coming into contact with the blade means and negligibly through the movement of air; and a second motor supported on the auger housing and drivingly connected to the projecting end of the auger shaft.

*13. A silo unloader for use in a silo having an upright silo wall with a side opening therein comprising: a main frame structure including a downwardly opening impeller chamber substantially at the center of the silo with a side discharge opening therein; a vertically disposed drive shaft extending through the chamber with a lower end beneath the chamber; upright impeller blade means fixed to and extending radially outwardly of the shaft to outer ends closely adjacent the walls of the chamber; a sweep auger drivingly connected to the lower end of the vertical shaft and extending from an inner end adjacent the chamber to an outer end adjacent the silo wall, the auger being supported on the frame structure to move over the silage surface; a flipper blade drivingly connected to the vertical shaft and substantially horizontally aligned with the inner end of the sweep auger and effective to move material received from the auger upwardly and within the path of the impeller blade means; a discharge means including a housing having an intake end supported on the frame structure for receiving material through the side discharge opening of the chamber and extending therefrom to an outer end terminating adjacent the side opening of the silo, and a device in the housing for moving the material between the intake and outer ends; and drive means effecting a slow rate of rotation of the drive shaft whereby the impeller blade means will move a small*

*volume of air, and material moved by the impeller blade means will be predominantly by material coming into contact with the blade means and negligibly by movement of air created by the blades.*

*14. A silo unloader for use in a silo having an upright silo wall with a side opening therein comprising: a main frame structure including a downwardly opening impeller chamber substantially at the center of the silo with a side discharge opening therein; a vertically disposed drive shaft extending through the chamber with a lower end beneath the chamber; upright impeller blade means fixed to and extending radially outwardly of the shaft to outer ends closely adjacent the walls of the chamber; a sweep auger having an auger shaft drivingly connected to the lower end of the vertical shaft and extending from an inner end adjacent the chamber to an outer end adjacent the silo wall, the auger being supported on the frame structure to move over the silage surface; a flipper blade drivingly supported on the auger shaft beneath the chamber and effective to move material received from the auger upwardly and within the path of the impeller blade means; a discharge means including a housing having an inlet and supported on the frame structure for receiving material through the side discharge opening of the chamber and extending therefrom to an outer end terminating adjacent the side opening of the silo, and a power operated device in the housing for moving material between the inlet and outer end; and drive means effecting rotation of the drive shaft and operating the discharge means.*

*15. A silo unloader for use in unloading silage from a silo comprising an elongated horizontally oriented auger engageable with the upper surface of the silage for cutting and conveying silage material longitudinally thereof; a support structure supporting the auger for horizontal travel upon the surface of the silage material within the silo with an inner end of the auger positioned adjacent the center of the silo and an outer end disposed adjacent the silo wall; a downwardly opening impeller chamber substantially at the center of the silo with a side discharge opening therein; means for driving the auger about the inner end in a circular horizontal path; discharge means including an inlet disposed in communicating relation with the discharge opening of the chamber and in close proximity to the inner end of the auger and a discharge adjacent an opening in the silo wall, and a power operated device for moving material between the inlet and discharge; impeller means interposed between the respective inner end and inlet including a pair of bladed rotating impellers arranged in close cooperative relation, one of the bladed impellers being positioned beneath the chamber and revolvable about a horizontal axis substantially on the level of the auger and the other bladed impeller being positioned above said one impeller and within the chamber and being revolvable about a vertical axis, the bladed impellers cooperating with each other to receive and impel the material from the inner end of the auger to the inlet of the discharge means from whence the silage is moved outwardly of the silo.*

*16. A silo unloader for use in unloading silage from a silo comprising an elongated horizontally oriented auger engageable with the upper surface of the silage for cutting and conveying silage material longitudinally thereof; a support structure supporting the auger for horizontal travel upon the surface of the silage material within the silo with an inner end of the auger positioned adjacent the center of the silo and an outer end disposed adjacent the silo wall; means for driving the auger about the inner end in a circular horizontal path; discharge means including an inlet disposed in close proximity to the inner end of the auger and a discharge adjacent an opening in the silo wall, and a power operated device for moving material between the inlet and discharge; impeller means interposed between the respective inner end and inlet including a pair of bladed rotating impellers arranged in close cooperative relation, one of the bladed impellers being revolvable about a horizontal axis aligned with the auger and the other bladed impeller being positioned above said one impeller and being revolvable about a vertical axis, the bladed impellers cooperating with each other to receive and impel the material from the inner end of the auger to the inlet of the discharge means from whence the silage is moved outwardly of the silo.*

*17. A silo unloader for use in unloading silage from a silo comprising a support structure; a downwardly opening chamber with a side discharge opening therein carried on the structure at the center of the silo; means supporting an auger on the structure for horizontal travel upon the surface of the silage material within the silo, the auger having an inner end positioned adjacent the center of the silo and beneath the chamber and an outer end disposed adjacent the silo wall; means for driving the auger about the inner end in a circular horizontal path; discharge means including an inlet in communication with the discharge opening and at a level above the inner end of the auger and a discharge adjacent an opening in the silo wall, and a power operated device for moving material between the inlet and discharge; impeller means interposed between the respective inner end and inlet including a pair of bladed rotating impellers arranged in close cooperative relation, one of the bladed impellers being on the auger inner end and revolvable about a horizontal axis aligned with the auger and the other bladed impeller being positioned above said one impeller and being revolvable about a vertical axis, the bladed impellers cooperating with each other to receive and impel the material from the inner end of the auger first upwardly into the chamber and then outwardly through the side discharge opening of the chamber to the inlet of the discharge means from whence the silage is moved outwardly of the silo.*

*18. A silo unloader for use in unloading silage from a silo comprising a support structure; a downwardly opening chamber with a side discharge opening therein carried on the structure at the center of the silo; means supporting an auger on the structure for horizontal travel upon the surface of the silage material within the silo, the auger having an inner end positioned adjacent the center of the silo and beneath the chamber and an outer end disposed adjacent the silo wall; means for driving the auger about the inner end in a circular horizontal path; discharge means including an inlet in communication with the discharge opening and at a level above the inner end of the auger and a discharge adjacent an opening in the silo wall, and a power operated device for moving material between the inlet and discharge; impeller means interposed between the respective inner end and inlet including a pair of bladed rotating impellers arranged in close cooperative relation, one of the bladed impellers being revolvable about a horizontal axis and in material receiving relation with the inner end of the auger and the other bladed impeller being positioned above said one impeller and being revolvable about a vertical axis, the bladed impellers cooperating with each other to receive and impel the material from the inner end of the auger first upwardly into the chamber and then outwardly through the side discharge opening of the chamber to the inlet of the discharge means from whence the silage is moved outwardly of the silo.*

*19. The invention defined in claim 18 in which the discharge means includes a housing attached to the chamber at the side discharge opening and further includes crop transferring elements in the housing movable by the side opening for receiving and propelling material received therethrough to the discharge of the discharge means.*

(References on following page)

References Cited by the Examiner

The following references, cited by the Examiner, are of record in the patented file of this patent or the original patent.

UNITED STATES PATENTS

| | | |
|---|---|---|
| 1,866,005 | 7/1932 | Beatty. |
| 2,465,145 | 3/1949 | Brainerd. |
| 2,678,241 | 5/1954 | Miller. |

| | | | |
|---|---|---|---|
| 2,719,058 | 9/1955 | Van Dusen | 214—17 X |
| 2,801,885 | 8/1957 | Harris | 214—17 X |
| 2,858,033 | 10/1958 | Hofer | 214—17 X |
| 2,988,238 | 6/1961 | Bruecker. | |
| 3,017,043 | 1/1962 | Buschbom. | |

GERALD M. FORLENZA, *Primary Examiner.*

R. G. SHERIDAN, *Assistant Examiner.*

UNITED STATES PATENT OFFICE

CERTIFICATE OF CORRECTION

Reissue No. 26,072

August 2, 1966

Sylvan H. Sime

It is hereby certified that error appears in the above numbered patent requiring correction and that the said Letters Patent should read as corrected below.

In the grant, lines 2 and 3, strike out "assignor to Deere & Company, of Moline, Illinois, a corporation of Delaware," line 15, for "Deere & Company, its successors" read -- Sylvan H. Sime his heirs --; in the heading to the printed specification, lines 3 and 4, strike out "assignor to Deere & Company, Moline, Ill., a corporation of Delaware --.

Signed and sealed this 8th day of August 1967.

(SEAL)
Attest:

Edward M. Fletcher, Jr.
Attesting Officer

EDWARD J. BRENNER
Commissioner of Patents